(12) United States Patent
Dixon et al.

(10) Patent No.: US 8,634,540 B1
(45) Date of Patent: Jan. 21, 2014

(54) SYSTEMS AND METHODS FOR PROVIDING TELEPHONE PROMPTS TO A CLIENT BASED ON WEB SITE ACTIVITIES OF THE CLIENT

(75) Inventors: David Patrick Dixon, Boerne, TX (US); Richard E. Moore, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 750 days.

(21) Appl. No.: 12/270,273

(22) Filed: Nov. 13, 2008

(51) Int. Cl.
*H04M 3/00* (2006.01)

(52) U.S. Cl.
USPC ............... 379/265.09; 379/88.17; 379/266.08

(58) Field of Classification Search
USPC .................. 379/67.1, 88.17, 265.02, 265.09, 379/266.07, 266.08
See application file for complete search history.

(56) References Cited

U.S. PATENT DOCUMENTS

| | | | |
|---|---|---|---|
| 2001/0011228 A1 | 8/2001 | Shenkman | |
| 2001/0029503 A1* | 10/2001 | Chee et al. | 707/101 |
| 2002/0141561 A1 | 10/2002 | Duncan et al. | |
| 2007/0041551 A1 | 2/2007 | Whitecotten et al. | |
| 2007/0274506 A1* | 11/2007 | Schundler | 379/265.01 |
| 2008/0095355 A1* | 4/2008 | Mahalaha et al. | 379/265.09 |
| 2009/0154686 A1* | 6/2009 | Purdy et al. | 379/265.09 |

OTHER PUBLICATIONS

Di Fabbrizio, Giuseppe et al.: "AT&T Help Desk", AT&T Labs Research, 4 pages.

* cited by examiner

*Primary Examiner* — Antim Shah
(74) *Attorney, Agent, or Firm* — Brooks, Cameron & Huebsch, PLLC

(57) ABSTRACT

Activities performed by a client at a site of an organization are monitored and stored in an activity database. A call is thereafter received from the client at a telephone system of the organization, which performs an identification of the client. The identification is provided to a cross-channel router as a request for a prediction on where the call from the client should be routed, and the router indexes into the activity database based on the identification of the client to obtain the monitored activity of the client. The router employs predicting rules and the obtained activity to generate a prediction of client needs, and returns the generated prediction to the telephone-based system, which presents prioritized telephone prompts to the client according to the returned prediction to help in routing the call.

18 Claims, 4 Drawing Sheets

SYSTEMS AND METHODS FOR PROVIDING TELEPHONE PROMPTS TO A CLIENT BASED ON WEB SITE ACTIVITIES OF THE CLIENT

CROSS-REFERENCE TO RELATED APPLICATION(S)

The present application is filed concurrently with and shares a common title and disclosure with the following applications, each of which is hereby incorporated herein by reference in its entirety:
U.S. patent application Ser. No. 12/270,279;
U.S. patent application Ser. No. 12/270,285;
U.S. patent application Ser. No. 12/270,396; and
U.S. patent application Ser. No. 12/270,409.

FIELD

The present disclosure is directed to systems and methods that route telephone calls or the like. In particular, the present disclosure relates to routing a call within an organization from a client or the like based on previous activity of the client with respect to the organization in a different communications channel.

BACKGROUND

In connection with an organization or the like having customers, members, clients, or the like (hereinafter, 'clients'), it may be the case that the organization provides a site or the like that may be accessed by the clients of such organization by way of an appropriate corresponding communications channel. For example, it may be that the organization maintains a web site accessible by clients of the organization by way of an inter-network communications medium such as the Internet. With such a site, then, each client of the organization may access information from the organization, perhaps including information relevant to such client.

Accordingly, if the organization is an insurance company and the client is a customer having one or more policies with the insurance company, the site may allow the customer to access information from the insurance company regarding the policies, such as whether a payment has been received or whether a policy covers a particular loss, among other things. In addition, the site may allow the customer to access information from the insurance company regarding the availability and cost of an additional policy, among other things. Similarly, if the organization is a financial institution and the client is an account holder having one or more accounts with the financial institution, the site may allow the account holder to access information from the financial institution regarding the accounts, such as whether a deposit has been received or whether interest has been credited, among other things. In addition, the site may allow the account holder to access information from the financial institution regarding the availability of an additional account or a loan, among other things. Likewise, if the organization is a merchandise retailer and the client is a purchaser of the retailer, the site may allow the purchaser to access information from the retailer regarding particular merchandise available, among other things. In addition, the site may allow the purchaser to access information from the retailer regarding whether a returned item has been received, among other things.

Notably, a site of an organization can provide particular information to a client of the organization only if the site has access to such particular information and if the client can successfully navigate through the site to find such particular information. Thus, if the client requires particular information, the organization provides such particular information at the site thereof, and the client locates such particular information at the site, then the client is satisfied. However, if the client requires particular information and the organization does not provide such particular information at the site thereof, the client cannot locate such particular information at the site, or the client has questions about such particular information, then the client is not satisfied.

In the case where the client is not satisfied because the organization does not provide such particular information at the site thereof, the client cannot locate such particular information at the site, or the client has questions about such particular information, the client oftentimes can attempt to obtain the particular information from a different communications channel. Typically, although by no means exclusively, the different communications channel is a telephone channel, whereby the organization provides a telephone-based system for the client to call the organization to obtain information. As is generally known, in such a telephone-based system it may be that the client calls the organization by way of a particular telephone number to speak to a service representative or agent or the like that is provided by the organization for the specific purpose of servicing telephone calls from clients.

Oftentimes, prior to speaking to such a service representative, the calling client is first routed within the telephone-based system according to one or more routing criteria. Such routing is generally known, and may be performed when the organization has several areas of operations, each of which has corresponding sets of service representatives. For example, if the organization is a financial institution, it may be that a call from a client is routed to different sets of service representatives depending on whether the call relates to a deposit account, a loan, or a credit card, among other things. Similarly, if the organization is an insurance company, it may be that a call from a client is routed to different sets of service representatives depending on whether the call relates to home insurance, auto insurance, or life insurance, among other things. In any case, such routing may be performed by way of a series of menus presented to a calling client, or by other appropriate mechanisms.

Notably, when a client calls the organization to speak to a service representative after not being able to obtain particular information from the site of the organization, the client has already effectively used an appreciable amount of time and effort at the site. Despite this, the telephone-based system of the organization is unaware of the previous activity that the calling client undertook at the site and thus has to start anew with the calling client to route same to an appropriate service representative who can service the calling client. Of course, such starting anew requires more time and effort on the part of the client, which as should be understood may add to the dissatisfaction experienced by the client.

To compound matters, such starting anew also requires time and effort on the part of the telephone-based system and by extension the organization. Particularly if the organization is relatively large and has many different sets of service representatives to whom the call may be routed, the time and effort spent to route each call by the telephone-based system can quickly add up to a considerable expense, even over a relatively short period of time. Moreover, such considerable expense can be compounded when it is considered that the telephone-based system misroutes an appreciable number of calls, perhaps on the order of 10-20 percent. As should be understood, such misrouted calls cause clients additional dissatisfaction and also require time and effort be expended by the service representatives who have to re-route the calls.

Accordingly, a need exists for a cross-channel method and system that addresses the current shortcomings above and others.

SUMMARY

The aforementioned needs are satisfied at least in part by systems and methods employed to route a call from a client to a service representative of an organization. Activities performed by the client at a site of the organization are monitored and data corresponding to the monitored activities is stored in an activity database indexed according to the client. The call is thereafter received from the client at a telephone-based answering and forwarding system of the organization, which performs an identification of the client.

The telephone-based system provides the identification of the client to a cross-channel routing system as a request for a prediction therefrom on where the call from the client should be routed, and the cross-channel routing system indexes into the activity database based on the identification of the client to obtain the data corresponding to the monitored activity of the client. The cross-channel routing system employs predicting rules and the obtained data to generate a prediction of where the call from the client should be routed and/or prioritize telephone prompts that are presented to the caller to help accurately route the call of the client.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
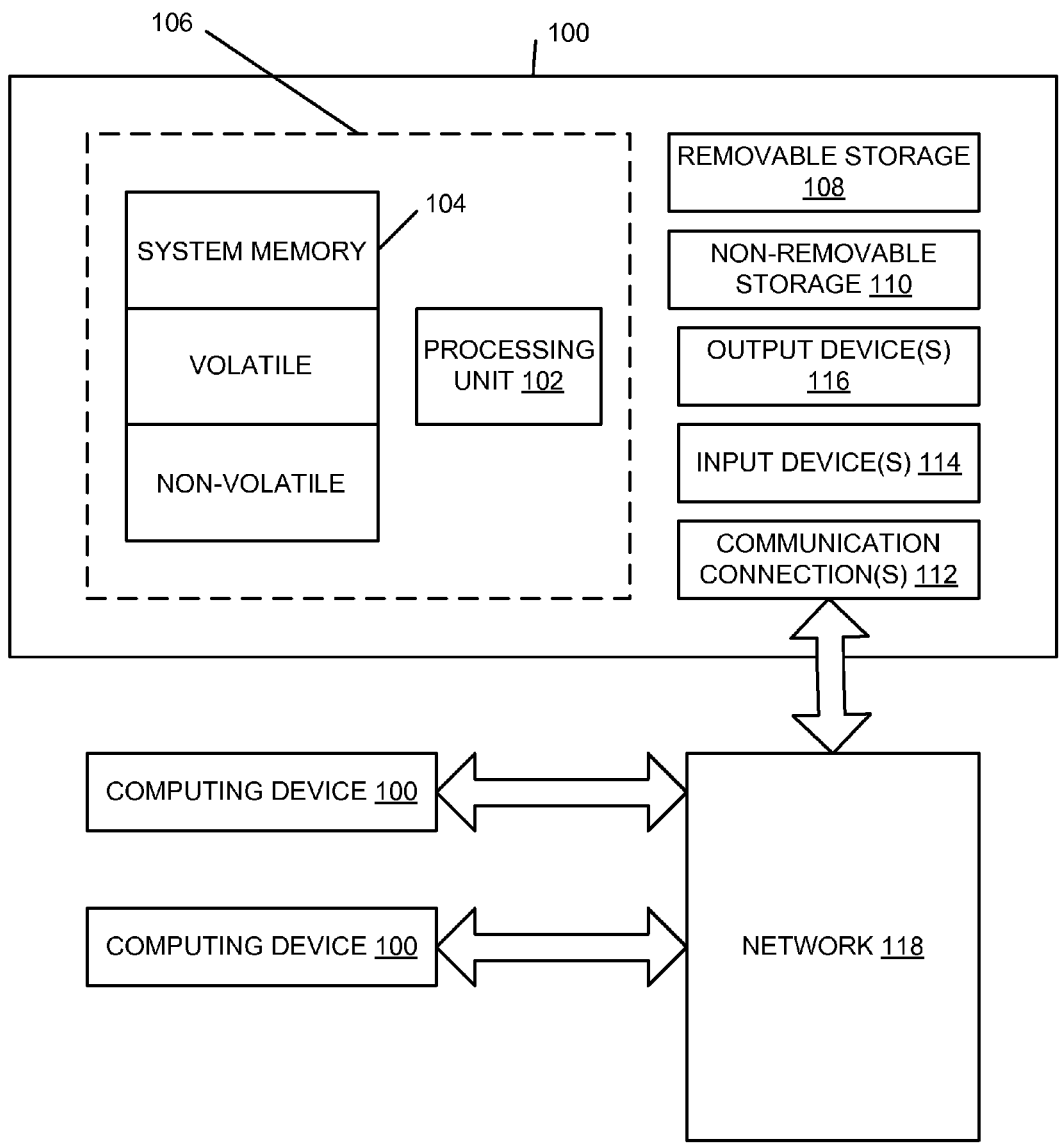
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Cross-Channel Call from Client

In various embodiments of the present innovation, and turning now to FIG. 2, it is seen that an organization 10 or the like has customers, members, clients, or the like (hereinafter, 'clients 12') which look to the organization 10 for goods and/or services and/or the like. As should be understood, the organization 10 may be most any entity, such as for example a corporation, a business, an association, or the like. Presumably, the organization 10 has a relatively large number of clients 12 who desire to obtain information and/or services from such organization 10.

As shown, the organization 10 provides a site 14 or the like that may be accessed by the clients 12 of such organization 10 by way of an appropriate corresponding communications channel. For example, it may be that the organization 10 maintains a web site accessible by clients 12 of the organization 10 by way of an inter-network communications medium such as the Internet, although the site 14 may alternately be another type of site accessible by another type of communications channel. With such a site 14, and as should be appreciated, each client 12 of the organization 10 can perform transactions to access information and services from the organization 10, including transactions relevant to such client. To do so, the client 12 presumably has an account or the like with the organization 10 where such account includes access to the site 14 of the organization 10 by way of a user name and password or the like. Access to such site 14 by such client 12 is generally known and therefore need not be set forth herein in any detail other than which is provided.

As was set forth above, the type of site 14 and the transactions performed thereat by the client 12 may vary depending on the type of organization 10. For example, if the organization 10 is an insurance company and the client 12 is a customer having one or more policies with the insurance company, the site 14 may allow the customer to perform transactions with the insurance company regarding policies of the client, available policies, etc. Similarly, if the organization 10 is a financial institution and the client 12 is an account holder having one or more accounts with the financial institution, the site 14 may allow the account holder to perform transactions with the financial institution regarding accounts of the client, available accounts, etc. Likewise, if the organization 10 is a merchandise retailer and the client 12 is a purchaser of the retailer, the site 14 may allow the purchaser to perform transactions with the retailer regarding particular merchandise available, purchases that are being shipped, etc.

As was also set forth above, a client 12 visiting a site 14 of an organization 10 can only perform particular transactions if the site has functionality necessary to service such particular transaction and if the client can successfully navigate through the site to find such particular functionality. However, if the client 12 requires particular information and the organization 10 does not provide such particular information at the site 14 thereof, the client cannot locate such particular information at the site, or the client has questions about such particular information, then the client may not be satisfied and may attempt to obtain the particular transaction from a different communications channel. Typically, although by no means exclusively, the different communications channel is a telephone channel, whereby the organization provides a telephone-based system 16 for the client to answer a telephone call from the client 12 to the organization 10 to obtain the information.

As is generally known, in such a telephone-based system 16, the client 12 calls the organization 10 by way of a particular telephone number to speak to a service representative or agent or the like (hereinafter, 'service representative 18') that is provided by the organization 10 to service telephone calls from clients 12. The service representatives 18 of the organization 10 may be any appropriate service representatives and may be organized in any appropriate manner. For example, the service representatives 18 may be trained to handle most typical transactions that the client 12 may request, and may be organized along lines of business of the organization 10, among other things. Thus, if the organization 10 is a financial institution, it may be that a call from a client 12 is routed to different sets of service representatives depending on whether the call relates to a deposit account, a loan, or a credit card, among other things. Similarly, if the organization 10 is an insurance company, it may be that a call from a client 12 is routed to different sets of service representatives depending on whether the call relates to home insurance, auto insurance, or life insurance, among other things.

Upon dialing the particular telephone number, the client 12 first encounters the telephone-based system 16 which answers the call, authenticates the caller, presents routing options to the caller based on predictive models from a website click trail history of the client and other data components (such as products owned, caller history, etc.), and routes call based on caller response. Typically, the telephone-based system 16 presents options to the client 12 in an automated manner, perhaps in the form of an orally presented menu, and the client upon selecting an option from the menu may be presented additional options or may be routed directly.

As was pointed out above, when a client 12 calls the organization 10 to speak to a service representative 18 after not being able to perform a particular transaction from the site 14 of the organization 10, the client 12 has already effectively used an appreciable amount of time and effort at the site 14, is likely at least somewhat frustrated, and does not wish to expend any more additional time and effort other than that which is necessary sorting through automated menus as may be presented by the telephone-based system 16. Moreover, the organization 10 does not wish to expend any more additional time and effort other than that which is necessary presenting automated menus to the client 12. Particularly if the organization 10 is relatively large and has many different sets of service representatives 18 to whom a call may be routed, the time and effort spent to route each call by the telephone-based system 16 can quickly add up to a considerable expense, even over a relatively short period of time.

Cross-Channel Call Routing

Accordingly, in various example embodiments of the present innovation, a call from a client 12 is presented prioritized routing options by the telephone-based system 16 of the organization 10 aided at least in part based on analyzed activity that the client undertook at the site 14 of the organization 10. In particular, and as seen in FIG. 2, in various embodiments of the present innovation, a cross-channel routing system 20 monitors the activities of the client 12 at the site 14. Information captured on the site 14 is used to help prioritize the telephone prompts that are presented by the telephone-based system 16 of the organization 10 to the client 12 to help accurately route the call.

In general, the activity of the client 12 at the site 14 of the organization 10 as monitored by the cross-channel routing system 20 may be most any appropriate activity, and such monitoring may be performed in most any appropriate manner, all without departing from the spirit and scope of the present innovation. For example, the activity of the client 12 monitored may include each part (page, e.g.) of the site 14 that the client 12 navigates to, how long the client 12 is at each part of the site 14, each search the client 12 performs at the site 14, the search results from each search that the client 12 navigates to, how many times the client 12 navigates to each part of the site 14, and whether the client prints any part of the site 14, among other things. This process is generally referred to as click trail navigation history. The click trail may be monitored and recorded for a single channel or multiple channels such as web and/or a smart-phone device. Also other activities may be monitored and/or stored, for example, such as caller history, products owned, solicits, claims, pending applications, etc. Such monitoring may be performed by the cross-channel routing system 20 according to pre-defined rules which may be any appropriate rules.

Figure 2:
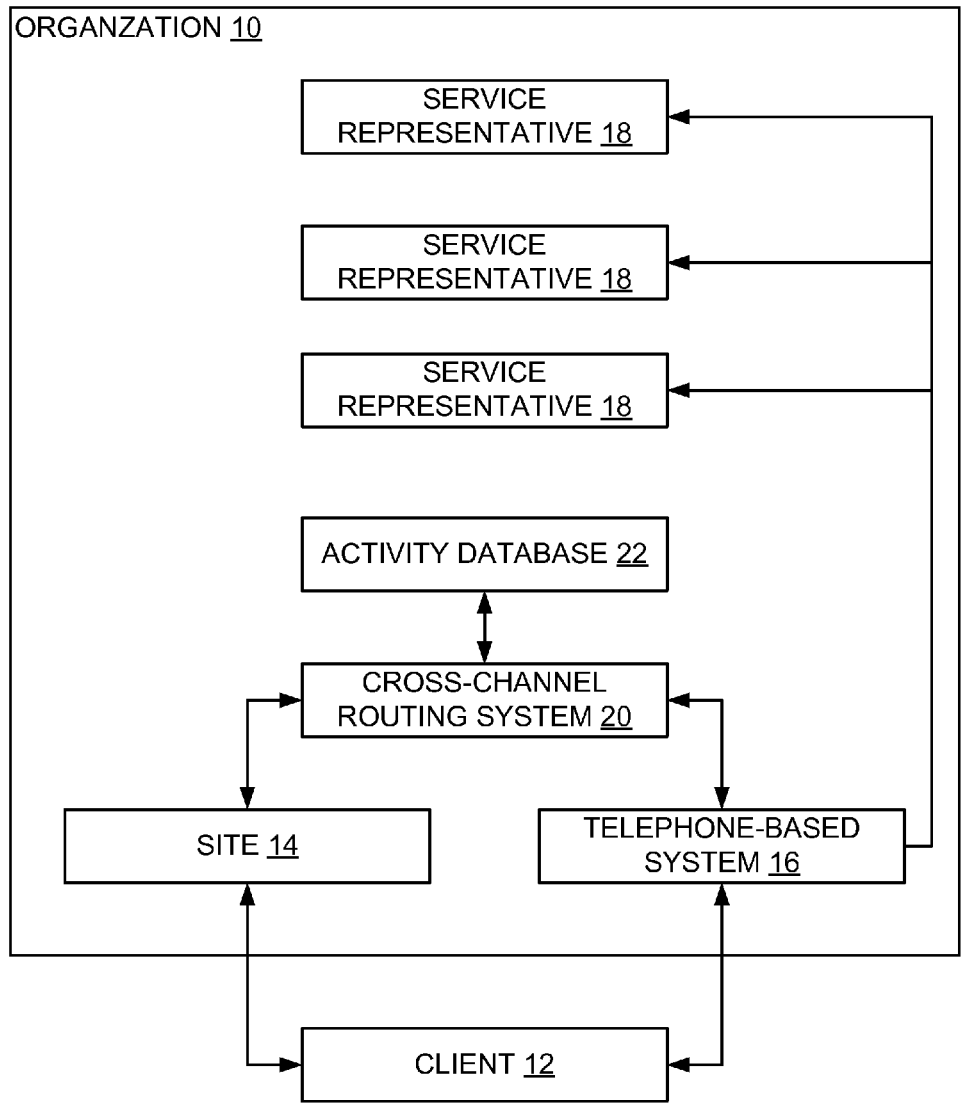
FIG. 2 is a block diagram of an organization with a site, a telephone-based system, and a cross-channel routing system for predicting why a caller who has visited the site is calling the organization in accordance with various embodiments of the present innovation.

In various embodiments of the present innovation, the cross-channel routing system 20 may store data corresponding to the monitored activity of each client 12 in an appropriately configured activity database 22, as is seen in FIG. 2. As shown, the activity database 22 stores the data indexed according to each client 12 for ease of access therefrom based on the client 12. As should be understood, the system 20 may identify each client 12 at the site 14 by way of identifying information supplied by the client 12 when accessing the site 14, such as for example a user name and password.

As should be understood, the cross-channel routing system 22 attempts to predict with some minimum level of certainty why a client 12 is calling the organization 10 based on recent activity of the client 12 at the site 14 of the organization 10. Thus, the system 22 is forward-looking and operates at least partially before the client 12 actually calls. Such predicting may be performed in any appropriate manner and based on any appropriate predicting rules. For example, one predicting rule may be that a client 12 is likely calling regarding a particular area of the organization 10 if the last activity of the client 12 at the site 14 is with regard to such particular area, but only if such last activity at the site 14 with regard to such particular area lasted longer than one minute. Similarly, another predicting rule may be that a client 12 is likely calling regarding a particular area of the organization 10 if the majority of activity of the client 12 at the site 14 in the last fifteen minutes is with regard to such particular area.

Since the system 22 relies on recent activity of the client 12 at the site 14, the data stored with regard to the client 12 in the activity database is highly time-sensitive. That is, the value of such data decreases greatly as the data ages. Put simply, data collected 30 seconds ago is likely highly informative of why a client 12 might be presently calling the organization 10, while data collected two weeks ago is not likewise likely highly informative, and instead may be of almost no use in determining why a client 12 might be presently calling the organization 10. As a result, it may be that the activity database 22 regularly flushes data therefrom when the data ages beyond a certain level, such as for example an hour, a few hours, or a day.

Figure 3:
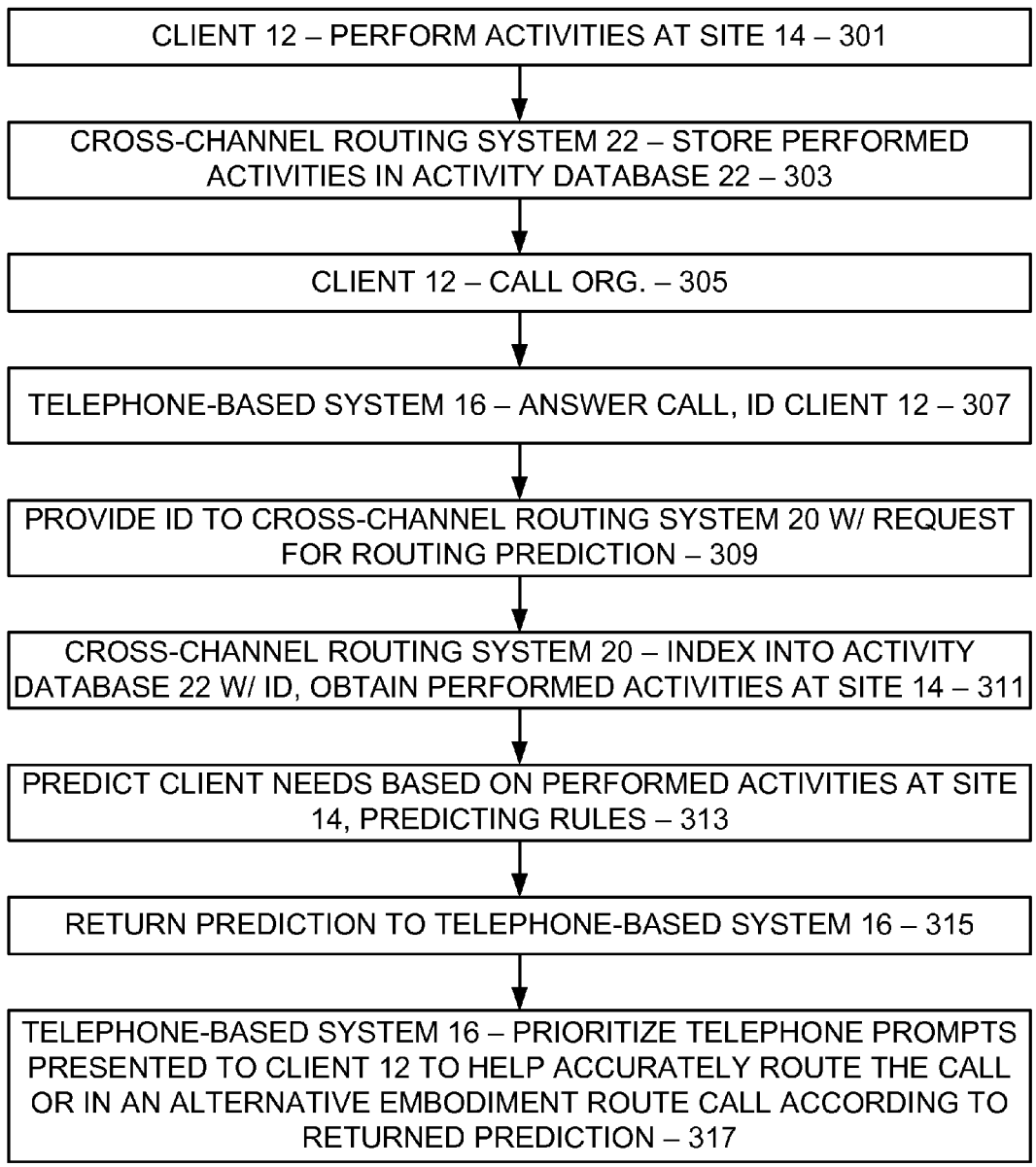
FIG. 3 is a flow diagram showing key actions performed in connection with the cross-channel routing system of FIG. 2 in accordance with various embodiments of the present innovation.

Turning now to FIG. 3, it is seen that the cross-channel routing system 20 is employed in the following manner. Preliminarily, a client 12 visits the site 14 of the organization 10 and performs activities at the site 14, such as for example viewing various parts of the site 14, performing transactions including obtaining information and accessing services from the various parts of the site 14, and the like (301). In the course of the client 12 visiting the site 14, then, the cross-channel routing system 22 monitors the performed activities and stores corresponding data in the activity database 22 indexed according to the client 12 (303).

At some point thereafter, the client 12 calls the organization 10 (305), either after ceasing to perform activities at the site 14 or while still performing activities at the site 14. Presumptively, the telephone-based system 16 of the organization 10 answers the call from the client 12 in an effort to route the call to an appropriate service representative 18, and in doing so the telephone-based system 16 performs an identification of the client 12 in a generally automated manner (307). Identifying such client 12 in a generally automated manner may be performed in any appropriate manner, such as for example by identifying the telephone line that the client 12 is calling on, or by having the client 12 identify himself or herself by way of an entered identifier.

In various embodiments of the present innovation, once the calling client 12 is identified, the telephone-based system 16 provides the identification of the client 12 to the cross-channel routing system 20 as a request for a prediction therefrom to aid in routing the call (309). In response thereto, and as should now be appreciated, the cross-channel routing system 20 based on the identification of the calling client 12 indexes into the activity database 22 to obtain therefrom data corresponding to the monitored activity of the client 12 (311) and provide a prediction of the client needs (313). Thereafter, the cross-channel routing system 20 returns the prediction for the calling client 12 to the telephone-based system 16 (315), and such telephone-based system 16 then prioritizes the telephone prompts that are presented to the client 12 to help accurately route the call according to the returned prediction (317). In an alternative embodiment, the call may be directly routed to a particular member service representative based on the returned prediction (317).

Note that in the course of predicting where the calling client 12 should be routed as at 313, the cross-channel routing system 20 may develop a confidence level in the prediction, where the confidence level may be expressed as a scaled value. As may be appreciated, such a confidence level may be employed to determine whether the prediction should be used. That is, if the confidence level is relatively low, then the cross-channel routing system 20 may decide that the prediction should not be provided to the telephone-based system 16 and that instead no prediction should be provided or employed as at 315 and 317. In contrast, if the confidence level is relatively high, then the cross-channel routing system 20 may decide not only that the prediction should be provided, but that the prediction can be refined to be more precise, for example.

Note to that in the course of predicting where the calling client 12 should be routed as at 313, the cross-channel routing system 20 may refer to other data relating to the calling client as obtained from sources in addition to the activity database 22. For example, the cross-channel routing system 20 may determine from another database that the calling client 12 is a certain age, has a certain income level, lives in a certain location, and the like, and the returned prediction may incorporate such other data. Accordingly, if the calling client 12 lives in a region that just experienced a significant storm, for example, and the monitored activity of the client 12 shows that the client was reviewing home insurance information, the cross-channel routing system 20 may predict that the calling client 12 wishes to make a claim for storm damage based on the home insurance. Similarly, if the calling client 12 is nearing 65 years in age, for example, and the monitored activity of the client 12 shows that the client was reviewing retirement accounts, the cross-channel routing system 20 may predict that the calling client 12 wishes to start withdrawing retirement funds from the retirement accounts.

The prediction as provided by the cross-channel routing system 20 to the telephone-based system 16 as at 315 may take any appropriate form. For example, the provided prediction may specify a particular line of business in which the calling client 12 is likely interested. Likewise, the provided prediction may specify not only a particular line of business in which the calling client 12 is likely interested, but also a particular issue or matter or account or the like of interest, in which case the telephone-based system 16 may be able to prioritize the telephone prompts provided to the client based on such a prediction or route the calling client 12 to a specific service representative 18 within such line of business that presumptively has a prior connection to such issue/matter/account/etc. In contradistinction, the provided prediction may not necessarily specify a particular line of business in which the calling client 12 is likely interested, but instead may specify that the client 12 has a particular status, in which case the telephone-based system 16 would be able to prioritize the telephone prompts provided to the client based on such a prediction or, in a alternative embodiment, route the calling client to a service representative 18 that services clients 12 having such status. Notably, such status may for example be that the client 12 is an especially valued client, or that the client 12 is an especially troublesome client, among other things.

The telephone-based system 16 may employ such returned prediction in any appropriate manner. In an alternative embodiment, if the prediction is specific, the calling client 12 may be routed immediately to an appropriate service representative 18 without presenting the calling client 12 with any automated menus, prompts or the like. Of course, as a matter of courtesy it may be that the calling client 12 is first given an opportunity to confirm the prediction. Also, the telephone prompts and menus provided to the client may be prioritized based on the prediction. For another example, if the prediction is not specific but instead is more general, the calling client 12 may be forwarded into a hierarchy of automated menus, but advanced by one or more levels into the hierarchy based on the prediction. Again, as a matter of courtesy it may be that the calling client 12 is first given an opportunity to confirm the prediction. Note here that if the calling client 12 repudiates the prediction, the telephone-based system 20 may merely be forwarded into such a hierarchy of automated menus, but to the top level of the hierarchy.

It may be that the prediction is indeterminate in that a number of possible areas of interest to the calling client 12 are provided. In such a case, the calling client 12 may be forwarded into a customized menu that lists the possible areas of interest, perhaps in some ranked order, and that prompts the calling client 12 to select from such possible areas of interest or 'other'. As should be understood, a selection by the client 12 of one of the possible areas of interest results in the client 12 being forwarded to the hierarchy of automated menus, but advanced by one or more levels into the hierarchy based on the selection, while a selection by the client 12 of 'other' results in the client 12 being forwarded into the hierarchy of automated menus, but to the top level of the hierarchy.

Of course, the calling client 12 is ultimately forwarded by way of the telephone-based system 20 to a live or automated service representative 18 to be serviced thereby. In various embodiments of the present innovation, upon the calling client 12 having been serviced by such a service representative 18, the service representative 18 inquires as to how the cross-channel communication occurred. In particular, the service representative 18 collects information from the calling client 12 regarding whether the site 14 of the organization 10 was deficient in that the client 12 decided to call the organization 10, and if so, how. As may be appreciated, such collected information may then be forwarded to an appropriate party within the organization 10 so that the deficiency may be addressed. In addition or in the alternative, the collected information may also be forwarded to an appropriate party within the organization 10 so that the prediction rules employed by the cross-channel routing system 20 may be improved.

Figure 4:
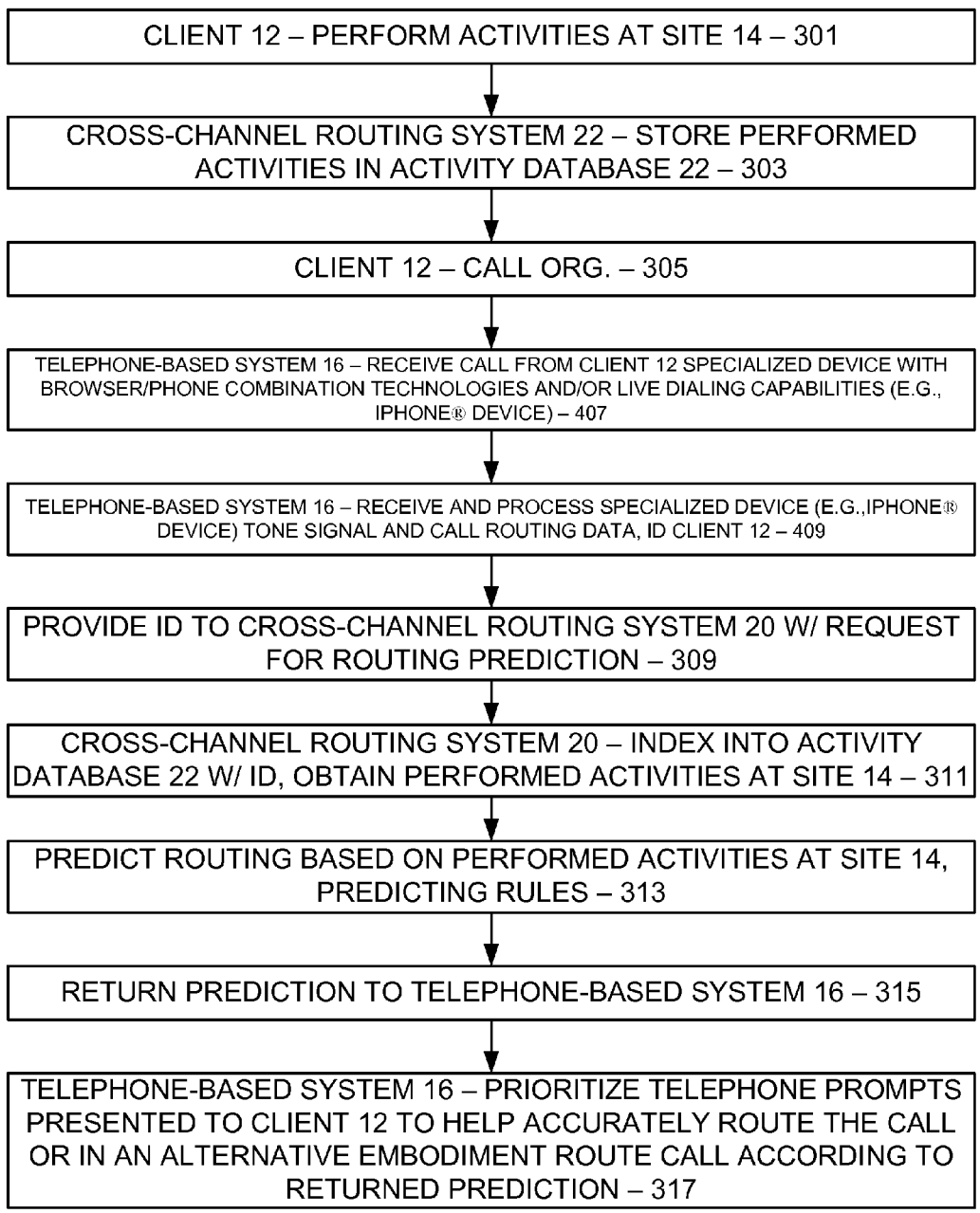
FIG. 4 is a flow diagram showing key actions performed in connection with the cross-channel routing system of FIG. 2 in accordance with an embodiment of the present innovation for receiving and routing calls from a device with browser/phone combination technologies and/or live dialing capabilities (e.g., iPhone®-type devices).

Referring next to FIG. 4, shown is a flow diagram showing key actions performed in connection with the cross-channel routing system of FIG. 2 in accordance with an embodiment of the present innovation for receiving and routing calls from a device with browser/phone combination technologies and/or live dialing capabilities (e.g., iPhone®-type devices, available from Apple, Inc., Cupertino, Calif.). The process shown in FIG. 4, is similar to that of FIG. 3 except that after the client 12 calls (305) the organization, the telephone-based system 16 receives (407) a call from a specialized device with browser/phone combination technologies and/or live dialing capabilities (e.g., an iPhone®-type device). The telephone-based system 16 then receives and processes the specialized device (e.g. an iPhone®-type device) tone signal and call routing data and identifies the client (409). This process design expands the process capability for a special auto-recognizable iPhone®-type device signal that lets the telephone-based system 16 know to wait a very small amount of time for subsequent routing data signals with duplicate matching confirmation tones to reduce the possibility of errors due to cell phone signal gaps. Also, the client 12 may select an "Expert Direct" (or similar name) button on the specialized device (e.g., iPhone® or other smart device) which dials the organization and triggers the sending of specific data about the area of expertise needed/request by the client 12 to the telephone-based system 16 based on which button was selected for priority routing options and messaging. This inbound iPhone®-type data signal receiving process (409) may also trigger a notification to a member service representative and/or related systems that the device of the client 12 is able to upload pictures and images for the process at hand or other ongoing organizational processes (e.g., insurance claims services or mortgage services) if necessary.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, a cross-channel method and routing system 20 are provided to route a call from a client 12 of an organization 10 who has already visited a site 14 of the organization 10, where the cross-channel routing system 20 does not require a telephone-based system 16 of the organization 10 to start anew when routing the call to a service representative 18 within the organization 10. The cross-channel routing system 20 employs information on the visit to the site 14 by the client 12 to route the call within the organization 10.

It should be appreciated that changes could be made to the embodiments described above without departing from the innovative concepts thereof. For example, although the present innovation is set forth primarily in terms of the cross-channel routing system 20 both collecting data and making predictions based thereon, either such functionality may be removed from the system 20 and located elsewhere. Thus, it may be that the cross-channel routing system 20 collects the data and the telephone-based system 16 makes predictions based thereon, or that the site 14 collects the data and the telephone-based system 16 makes predictions based thereon. It should be understood, therefore, that this innovation is not limited to the particular embodiments disclosed, but it is intended to cover modifications within the spirit and scope of the present innovation as defined by the appended claims.

The invention claimed is:

1. A method of routing a call from a client to a service representative of an organization, the method comprising:
   monitoring activities of the client at a site of the organization;
   upon the call from the client being received at a telephone-based system of the organization, receiving a request from the telephone-based system for a set of information regarding the monitored activities and other data from a different source that is location specific;
   removing information from the set of information when an age of the information in the set of information is greater than a predetermined age, wherein a value of the set of information regarding the monitored activities decreases as the information ages;
   predicting why the client is calling the organization based on the monitored activity of the client at the site and the other data that is location specific, the prediction being performed by applying predicting rules to the monitored activity and the other data that is location specific;
   calculating a confidence level in the prediction, wherein the confidence level may be expressed as a scaled value and wherein the confidence level may be used to determine whether the prediction should be used; and
   determining telephone prompts to be presented to the client based on the monitored activities of the client at the site and the other data that is location specific, wherein the telephone prompts to be presented to the client are based on the prediction if it is determined that the prediction should be used.

2. The method of claim 1 wherein the monitored activities of the client at the site are selected from a group that includes each part of the site that the client navigates to, how long the client is at each part of the site, each search the client performs at the site, search results obtained from each search that the client navigates to, how many times the client navigates to each part of the site, and whether the client prints any part of the site.

3. The method of claim 1 wherein the monitored activities of the client are stored in an activities database indexed according to the client.

4. The method of claim 1 wherein the client is identified at the site by way of identifying information supplied by the client when accessing the site, the identifying information including at least a user name.

5. The method of claim 1 wherein the telephone prompts to be presented to the client are determined by predicting why the client is calling the organization based on the monitored activity of the client at the site, the predicting being performed by applying predicting rules to the monitored activity, the predicting rules being selected from a group that includes a predicting rule that the client is likely calling regarding a particular area of the organization if a recent activity of the client at the site is with regard to such particular area, and a predicting rule be that the client is likely calling regarding a particular area of the organization if a majority of recent activity of the client at the site is with regard to such particular area.

6. The method of claim 1 wherein the monitored activities of the client occur prior to the call from the client.

7. A non-transitory computer-readable storage medium having computer-executable instructions thereon implementing a method of routing a call from a client to a service representative of an organization, the method comprising:
- monitoring activities of the client at a site of the organization;
- upon the call from the client being received at a telephone-based system of the organization, receiving a request from the telephone-based system for a set of information regarding the monitored activities and other data from a different source that is location specific;
- removing information from the set of information when an age of the information in the set of information is greater than a predetermined age, wherein a value of the set of information regarding the monitored activities decreases as the information ages;
- predicting why the client is calling the organization based on the monitored activity of the client at the site and the other data that is location specific, the prediction being performed by applying predicting rules to the monitored activity and the other data that is location specific;
- calculating a confidence level in the prediction, wherein the confidence level may be expressed as a scaled value and wherein the confidence level may be used to determine whether the prediction should be used; and
- determining telephone prompts to be presented to the client based on the monitored activities of the client at the site and the other data that is location specific, wherein the telephone prompts to be presented to the client are based on the prediction if it is determined that the prediction should be used.

8. The non-transitory medium of claim 7 wherein the monitored activities of the client at the site are selected from a group that includes each part of the site that the client navigates to, how long the client is at each part of the site, each search the client performs at the site, search results obtained from each search that the client navigates to, how many times the client navigates to each part of the site, and whether the client prints any part of the site.

9. The non-transitory medium of claim 7 wherein the monitored activities of the client are stored in an activities database indexed according to the client.

10. The non-transitory medium of claim 7 wherein the client is identified at the site by way of identifying information supplied by the client when accessing the site, the identifying information including at least a user name.

11. The non-transitory medium of claim 7 wherein the telephone prompts to be presented to the client are determined by predicting why the client is calling the organization based on the monitored activity of the client at the site, the predicting being performed by applying predicting rules to the monitored activity, the predicting rules being selected from a group that includes a predicting rule that the client is likely calling regarding a particular area of the organization if a recent activity of the client at the site is with regard to such particular area, and a predicting rule be that the client is likely calling regarding a particular area of the organization if a majority of recent activity of the client at the site is with regard to such particular area.

12. The non-transitory medium of claim 7 wherein the monitored activities of the client occur prior to the call from the client.

13. A system for routing a call from a client to a service representative of an organization, the system comprising:
- a subsystem that monitors activities of the client at a site of the organization;
- a subsystem that, upon the call from the client being received at a telephone-based system of the organization, receives a request from the telephone-based system for a set of information regarding the monitored activities and other data from a different source that is location specific;
- a subsystem that removes information from the set of information when an age of the information in the set of information is greater than a predetermined age, wherein a value of the set of information regarding the monitored activities decreases as the information ages;
- a subsystem that predicts why the client is calling the organization based on the monitored activity of the client at the site and the other data that is location specific, the prediction being performed by applying predicting rules to the monitored activity and the other data that is location specific;
- a subsystem that calculates a confidence level in the prediction, wherein the confidence level may be expressed as a scaled value and wherein the confidence level may be used to determine whether the prediction should be used; and
- a subsystem that determines telephone prompts to be presented to the client based on the monitored activities of the client at the site and the other data that is location specific, wherein the telephone prompts to be presented to the client are based on the prediction if it is determined that the prediction should be used.

14. The system of claim 13 wherein the monitored activities of the client at the site are selected from a group that includes each part of the site that the client navigates to, how long the client is at each part of the site, each search the client performs at the site, search results obtained from each search that the client navigates to, how many times the client navigates to each part of the site, and whether the client prints any part of the site.

15. The system of claim 13 wherein the monitored activities of the client are stored in an activities database indexed according to the client.

16. The system of claim 13 wherein the client is identified at the site by way of identifying information supplied by the client when accessing the site, the identifying information including at least a user name.

17. The system of claim 13 wherein the telephone prompts to be presented to the client are determined by predicting why the client is calling the organization based on the monitored activity of the client at the site, the predicting being performed by applying predicting rules to the monitored activity, the predicting rules being selected from a group that includes a predicting rule that the client is likely calling regarding a particular area of the organization if a recent activity of the client at the site is with regard to such particular area, and a predicting rule be that the client is likely calling regarding a particular area of the organization if a majority of recent activity of the client at the site is with regard to such particular area.

18. The system of claim 13 wherein the monitored activities of the client occur prior to the call from the client.

* * * * *